United States Patent
Yuzawa et al.

(10) Patent No.: US 7,753,339 B2
(45) Date of Patent: Jul. 13, 2010

(54) VALVE DEVICE

(75) Inventors: Satoshi Yuzawa, Tokyo (JP); Shousaku Makabe, Tokyo (JP); Kyoko Kojo, Tokyo (JP)

(73) Assignee: Yamatake Corporation, Tokyo (JP)

( * ) Notice: Subject to any disclaimer, the term of this patent is extended or adjusted under 35 U.S.C. 154(b) by 551 days.

(21) Appl. No.: 11/543,910

(22) Filed: Oct. 6, 2006

(65) Prior Publication Data
US 2007/0164247 A1   Jul. 19, 2007

(30) Foreign Application Priority Data
Oct. 14, 2005   (JP) .............................. 2005-300673

(51) Int. Cl.
*F16K 31/44* (2006.01)
(52) U.S. Cl. ..................................... 251/214
(58) Field of Classification Search .................. 251/214
See application file for complete search history.

(56) References Cited

U.S. PATENT DOCUMENTS

| | | | |
|---|---|---|---|
| 3,087,735 A * | 4/1963 | Aunspach et al. | 277/514 |
| 5,024,453 A * | 6/1991 | Suggs | 277/523 |
| 5,056,757 A | 10/1991 | Wood | |
| 5,090,087 A * | 2/1992 | Hipple et al. | 15/317 |
| 5,190,264 A | 3/1993 | Boger | |
| 5,290,010 A * | 3/1994 | Ridge | 277/522 |
| 5,549,305 A * | 8/1996 | Freund | 277/511 |
| 6,120,006 A * | 9/2000 | Yamaki et al. | 251/214 |

FOREIGN PATENT DOCUMENTS

| | | |
|---|---|---|
| CN | 88212234 | 11/1988 |
| CN | 2480112 | 3/2002 |
| JP | 64-030973 | 1/1989 |
| JP | 11-125366 A | 5/1999 |

OTHER PUBLICATIONS

Chinese Patent Office Action with translation (200610136143.0) issued on Jan. 4, 2008, 10 pages.

* cited by examiner

*Primary Examiner*—John K Fristoe, Jr.
*Assistant Examiner*—Marina TietJen
(74) *Attorney, Agent, or Firm*—Rothwell, Figg, Ernst & Manbeck, P.C.

(57) ABSTRACT

A valve device includes: a valve stem 4 vertically movably inserted in a staffing box 1; a gland packing 2 interposed between the staffing box 1 and the valve stem 4; a packing flange 9 disposed above the gland packing 2 through a packing follower 3; a spring case 6 that accommodates or holds Belleville springs 5, further abuts the packing flange 9 on its top face, and has groove portions 12 on its peripheral wall; and stud bolts 7 that press the gland packing 2 through the packing flange 9 and the spring case 6.

4 Claims, 6 Drawing Sheets

PRIOR ART

VALVE DEVICE

BACKGROUND OF THE INVENTION

1. Field of the Invention

The present invention relates to a valve device incorporated in pipings in a factory or plant.

2. Description of the Related Art

In recent years, as regards the air pollution problem, there is much debate on the effluent control of, particularly, volatile organic substances. In the United States and Germany, regular inspection of leakage and maintenance obligation for piping equipments of industrial plants are legally controlled, and many countries and regions are expected to follow this trend.

In compliance with the regulations, it is required that the gland sealing be maintained for a long term. Needless to say, this also meets the user's requirement that the repair cycle of equipments would like to be lengthened irrespective of types of fluids.

For this reason, packing manufacturers have provided new packings with high sealing characteristics on the one hand. Equipment manufactures have provided valve devices having a live load structure (Live Load Packing System) compensating for reduction of packing tightening force on the other hand.

In general, the gland packing used for the sealing member of fluid equipment reduces the tightening force thereof and thereby deteriorates the sealing characteristic as service time goes by. The live load structure compensates for this reduction by the restoring force of a spring, and the use of the structure has conventionally been recommended.

U.S. Pat. No. 5,056,757 (hereinafter, referred to as Patent Document 1), for example, discloses a valve device in which Belleville springs are stacked between a packing follower and a packing flange in externally exposed condition as one example of the valve device using the live load structure. FIG. 10 is a longitudinal sectional view showing the valve device disclosed in Patent Document 1.

Referring to FIG. 10, Belleville springs 5 are externally exposed between a packing follower 3 and a packing flange 9, and thereby, the valve device has an advantage that the stacked pattern of the Belleville springs 5 is easily checked. This is because the load characteristic of the live load mechanism is determined by the direction of building-in the Belleville springs 5 and the number of the springs.

However, there is a possibility that dust or the like adheres to the surface of the Belleville springs 5. Because the space in the stacked portion of the Belleville springs 5 is narrow, the dust, which once adhered thereto, is not flushed even by wind and rain, and there is a possibility that the Belleville spring is corroded even if the spring is made of stainless steel.

Further, U.S. Pat. No. 5,190,264 (hereinafter, referred to as Patent Document 2), for example, discloses a valve device having a live load structure that is prevented from external dust by placing Belleville springs within its packing follower, as another example of the valve device employing the live load structure. FIG. 11 is a longitudinal sectional view showing the valve device disclosed in Patent Document 2.

Referring to FIG. 11, the packing follower 3 accommodates the Belleville springs 5. This makes the valve device have a structure in which external dust does not easily adhere thereto.

However, even in the valve device disclosed in Patent Document 2, there is a possibility that the Belleville spring is corroded even if the spring is made of stainless steel, because the rain water, which once entered the device, is not readily removed. Further, there is another problem that the stacked pattern of the Belleville springs 5 cannot be seen from outside, which rather causes inconvenience.

Because the conventional valve devices have been arranged as described above, there is a problem that dust tends to adhere to the stacked portion of the Belleville springs.

Moreover, when the valve device had a structure in which the stacked portion of the Belleville spring resists the adhesion of dust, there arises a problem that the rain water, which entered the stacked portion of the Belleville spring, is not easily removed.

Furthermore, there is another problem that, when the valve device had a structure in which the stacked portion thereof resists the adhesion of dust, the stacked pattern of the Belleville springs cannot be visually checked from outside.

SUMMARY OF THE INVENTION

The present invention has been accomplished to solve the above-mentioned problems. An object of the present invention is to provide a valve device in which the stacked pattern of the Belleville springs can be visually checked from outside, in which the stacked portion of the Belleville springs resists the adhesion of dust, and from which the rain water that entered the device is readily removed.

A valve device of the present invention comprises: a valve stem which is vertically movably inserted in a packing-accommodating means; a gland packing interposed between the packing-accommodating means and the valve stem; a packing flange which has a valve-stem accommodating hole provided at the center thereof and tightening-member accommodating holes provided around the periphery of this valve-stem accommodating hole, and which is disposed above the gland packing through a packing-pressing means; a spring member having a valve-stem accommodating hole at the center thereof; a spring case which has a valve-stem accommodating hole provided at the center thereof, and tightening-member accommodating grooves and windows that are provided on the peripheral wall thereof, accommodates or holds said at least one or more spring members in the bottom opening of the valve-stem accommodating hole, and which abuts the packing flange on the top closure thereof around the periphery of the valve-stem accommodating hole; and a plurality of tightening members pressing the gland packing through the spring member, the spring case, and the packing flange.

According to the valve device of the present invention, the peripheral wall of the spring case may be graduated.

According to the valve device of the present invention, the tightening-member accommodating grooves and the windows that are provided on the peripheral wall of the spring case may be identically-shaped groove portions, and the groove portions may become the tightening-member accommodating grooves or the windows according to the circumferential position at which the spring case is disposed.

According to the valve device of the present invention, the packing flange and the spring case may be integrated into a unitized flange.

The valve device of the present invention may include a drop-preventing means at the bottom opening of the spring case.

A valve device of the present invention comprises: a valve stem which is vertically movably inserted in a packing-accommodating means; a gland packing interposed between the packing-accommodating means and the valve stem; a spring member having a valve-stem accommodating hole at the center thereof; a packing flange which has a valve-stem accommodating hole provided at the center thereof and tightening-member accommodating holes provided around the periphery of this valve-stem accommodating hole, accommodates or holds said at least one or more spring members in the bottom opening of the valve-stem accommodating hole, and which is disposed above the gland packing through a packing-pressing means; and a plurality of tightening members pressing the gland packing through the spring member and the packing flange.

According to the present invention, there is an advantageous effect that dust does not easily adhere to the surface of the spring because the spring member is covered with the spring case.

Moreover, there is an advantageous effect that rain water is easily downwardly drained and does not remain inside even when the rain water entered the device from the window provided on the peripheral face of the spring case.

Furthermore, the stacked pattern of the spring member can be visually checked, which makes it possible to easily check whether or not the direction of assembling the spring member thereinto and the number of spring members are proper when assembling the live load structure into the valve device.

According to the present invention, the amount of compression of the spring member can be easily adjusted by aligning the position of the spring member with the graduation provided on the peripheral wall of the spring case.

According to the present invention, when assembling the live load mechanism into the valve device, a distinction between the tightening-member accommodating groove and the window is not necessary. This increases the productivity of assembling.

According to the present invention, the reduction of the number of parts without changing the fundamental functions thereof, the improvement of the productivity of assembly, and the cost reduction can be accomplished by unitizing the spring case and the packing flange.

According to the present invention, the spring member accommodated in the spring case is prevented from dropping therefrom by providing the drop-preventing means. This can improve the productivity when assembling the live load mechanism into the valve device.

According to the present invention, the spring member is placed within the packing flange, which can improve the productivity of assembly, and can further prevent rain water from entering the spring member and dust from adhering thereto.

BRIEF DESCRIPTION OF THE DRAWINGS

FIG. 2A is a longitudinal sectional view thereof and FIG. 2B is a top plan view thereof;

FIG. 6A is a longitudinal sectional view thereof and FIG. 6B is a top plan view thereof;

FIG. 7A is a longitudinal sectional view thereof and FIG. 7B is a top plan view thereof;

FIG. 8A is a front view thereof and FIG. 8B is a top plan view thereof;

DETAILED DESCRIPTION OF THE PREFERRED EMBODIMENTS

Embodiment 1

Figure 1:
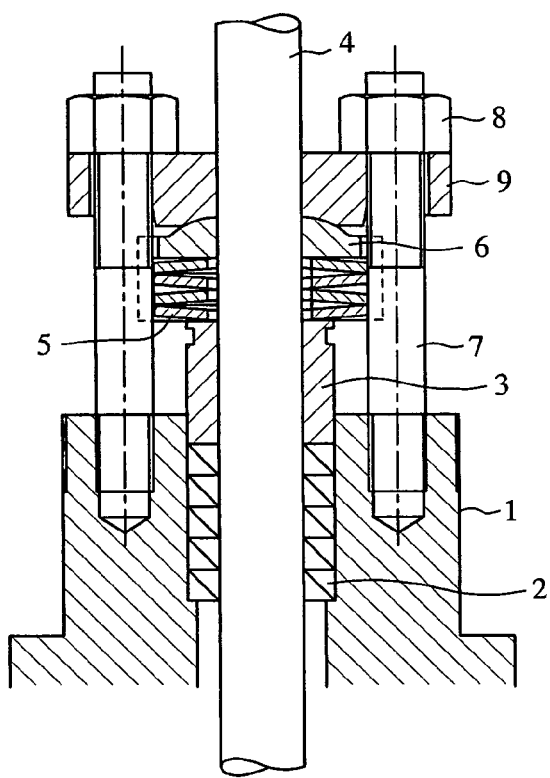
FIG. 1 is a longitudinal sectional view showing a valve device in accordance with embodiment 1 of the present invention.

Hereinafter, embodiment 1 of the present invention will now be described. FIG. 1 is a longitudinal sectional view showing a valve device according to embodiment 1 of the present invention.

Referring to FIG. 1, a valve stem 4 is vertically movably inserted in a staffing box 1 (packing-accommodating means). A gland packing 2 is interposed between a staffing box 1 and a valve stem 4. Further, a packing follower 3 through which the valve stem 4 is inserted abuts the top face of the gland packing 2.

Belleville springs 5 (spring member) in stacked condition are accommodated by a spring case 6 from the bottom opening of the spring case. Then, the valve stem 4 is inserted through the respective central holes (valve-stem accommodating or through holes, hereinafter) of the Belleville springs 5 and the spring case 6, and the Belleville springs and the spring case are disposed between a packing flange 9 and a packing follower 3 (packing-pressing means).

The packing flange 9 abuts the top closure of the spring case 6 around the periphery of the valve-stem accommodating hole of the case, and is disposed above the gland packing 2 through the packing follower 3.

A stud bolt 7 (tightening member) is screwed to the tapped hole provided in the upper portion of the staffing box 1 through a through hole (tightening-member accommodating hole hereinafter) provided around the valve-stem accommodating hole of the packing flange 9 in the vicinity of the peripheral portion of the flange. A nut 8 (tightening member) is screwed to the top threaded portion of the stud bolt 7. At that time, the stud bolt 7 is disposed so as to extend along a groove portion 12 provided in the periphery portion of the spring case 6.

The assembly procedure of the valve device shown in FIG. 1 will next be described as below. When assembling the structure described above, the procedure follows the following steps (1) to (5).

(1) The gland packing 2 and the packing follower 3 accommodate the valve stem 4.

(2) The distal threaded portion of the stud bolt 7 is screwed to the upper tapped hole of the staffing box 1.

(3) The spring case 6 accommodates the Belleville springs 5, and the spring case and the Belleville springs accommodate the valve stem 4 and the stud bolt 7.

(4) The valve-stem accommodating hole of the packing flange 9 accommodates the valve stem 4 and the tightening-member accommodating hole thereof accommodates the stud bolt 7, from above the spring case 6.

(5) The nut 8 is screwed to the top threaded portion of the stud bolt 7 to tighten the nut from above the packing flange 9. The order can be changed among the steps (1) to (3).

Figure 2A:
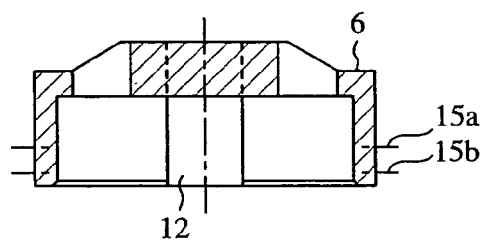
FIG. 2A and FIG. 2B are views showing the spring case shown in FIG. 1.
Figure 2B:
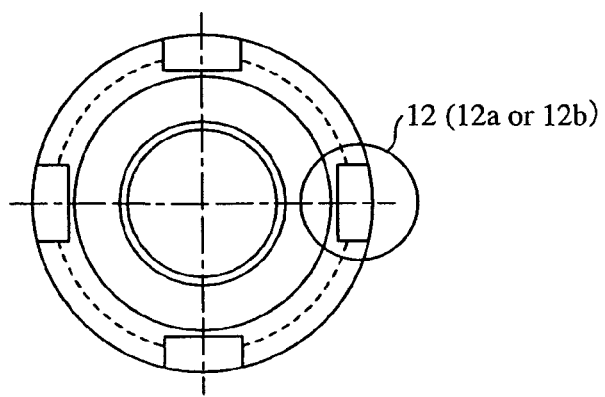

FIG. 2A and FIG. 2B are views showing the spring case shown in FIG. 1, FIG. 2A is a longitudinal sectional view thereof and FIG. 2B is a top plan view thereof. Referring to FIG. 2B, the spring case 6 is equipped with four groove portions 12 each having the same width and the same shape, disposed at 90° intervals around the peripheral wall thereof. A couple of groove portions 12 opposing to each other become tightening-member accommodating grooves 12a each accommodating the stud bolt 7. Further, another couple of grooves opposing to each other do not accommodate the stud bolt 7, but become windows 12b used for visibly checking the state of the Belleville springs 6 located inside.

Thread grooves 15a (the graduation at the tightening time) and 15b (the graduation at the assembling time), which are used for checking the position of the Belleville springs 5 located inside at the initial time of assembly and at the final time of tightening, are provided above the groove portions 12 on the surface of the peripheral wall of the spring case 6. As the nut 8 is increasingly tightened, the position of the Belleville springs 5 rises higher than the initial position thereof because the Belleville springs are compressed. Therefore, the graduation at the initial time of assembly becomes the thread groove 15b (the graduation at the assembling time), and the graduation at the final time of tightening becomes the thread groove 15a (the graduation at the tightening time).

Moreover, the spring case 6 also has the function of protecting the valve stem 4 and the Belleville springs 5 from external dust and rain water.

Figure 3:
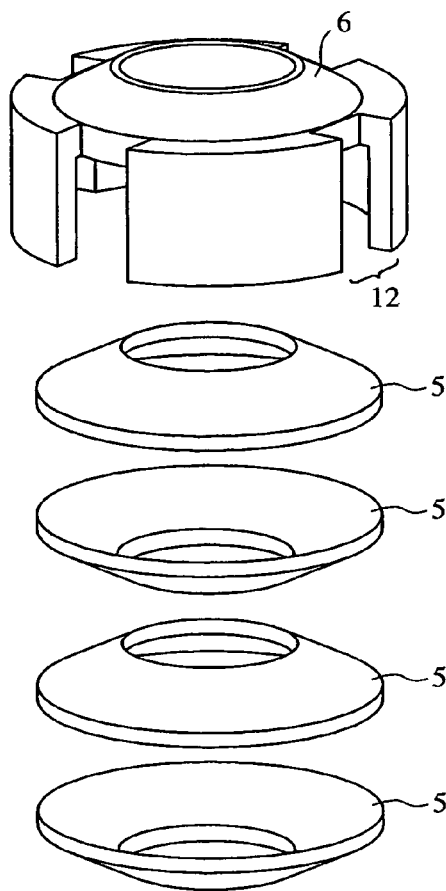
FIG. 3 is a view showing the Belleville springs in assembled relationship when stacking the springs into the spring case shown in FIG. 1.

FIG. 3 is a view showing the Belleville springs in assembled relationship when stacking the springs into the spring case shown in FIG. 1. Referring to FIG. 3, each of the Belleville springs 5 is hollow and truncated conical. Four Belleville springs 5 are accommodated in the spring case 6 from the bottom opening side of the case with the top sides and the bottom sides of the four Belleville springs being arranged in alternately abutting relation. In that case, each of the Belleville springs 5 is positioned by the inner peripheral face of the spring case 6, and the axial centers of the Belleville springs 5 and the spring case 6 conform with each other.

Furthermore, when assembling the Belleville springs 5 and the spring case 6 into the valve device, because the spring case 6 is guided by the stud bolts 7 in the tightening-member accommodating grooves 12a of the peripheral portion of the case, the axis centers of the two parts 5, 6 conform with that of the valve stem 4.

Figure 4:
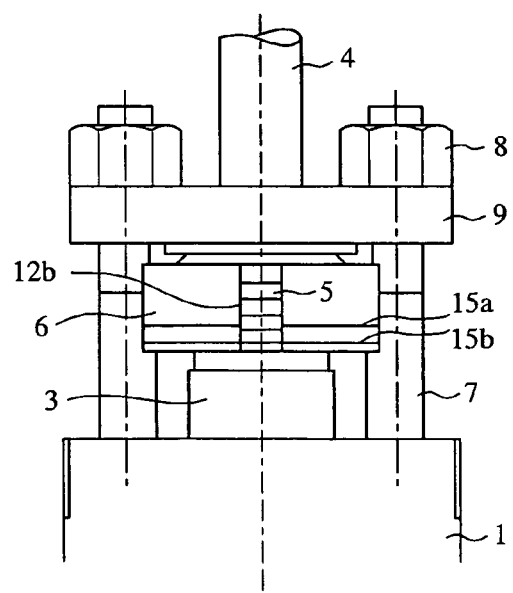
FIG. 4 is a front view showing the valve device shown in FIG. 1 after assembling the spring case thereinto, viewed from the direction of the window.

FIG. 4 is a front view showing the valve device shown in FIG. 1 after assembling the spring case thereinto, viewed from the direction of the window. Referring to FIG. 4, at the assembling time, the position of the Belleville springs 5 is aligned with the thread groove 15b (the graduation at the assembling time) by seeing the window 12b from the front, and at the tightening time, the nut 8 is tightened until the position of the Belleville springs 5 agrees with the thread groove 15a (the graduation at the tightening time). The graduation at the tightening time serves as a graduation indicating the amount of compression of the Belleville springs. Just aligning the Belleville springs 5 with this line eliminates the necessity of the control of the tightening torque of the nut 8, thus making easy the positioning thereof.

The conditions where the nut 8 is tightened will now be described as below. When the nut 8 is increasingly tightened, the spring case 6 receives the tightening force which is exerted on the packing flange 9 by the nut 8.

The restoring force from the initial compression of the Belleville springs 5 has acted on the packing follower 3. All the Belleville springs 5 are located outside the staffing box 1, which rain water can be readily drained even in the event of entering the valve device, and it does not remain on the stacked portion of the Belleville springs 5.

The Belleville springs 5 receives a compressive load while the external diameter of the spring is guided by the spring case 6. The spring case 6 also has the function of protecting the valve stem 4 and the Belleville springs 5 from external dust.

The spring case 6 is guided by the stud bolt 7 such that the axial center of the case conforms with that of the valve stem 4. Therefore, the valve stem 4 does not come in contact with the Belleville springs 5.

The gland packing 2 packed in the bottom of the staffing box 1 receives a compressive load from the packing follower 3, tightens the stuffing box 1 and the valve stem 4, and seals a fluid.

A leaf spring or the like, which has an elliptical or polygonal external shape and which has a valve-stem accommodating hole through which the valve stem 4 is inserted, can be used in place of the Belleville springs 5 used in the above description. In that case, it is necessary that the spring case 6 have a shape that can accommodate the above-described leaf spring (in the internal structure and the external structure).

In accordance with the embodiment 1, there is an advantageous effect that dust does not easily adhere to the surface of the Belleville springs 5 because the Belleville springs 5 are covered with the spring case 6.

There is an advantageous effect that rain water is easily downwardly drained and does not remain inside even when the rain water enters the device from the window 12b provided on the peripheral face of the spring case 6.

There is an advantageous effect that it is easy to check whether or not the direction of assembling the Belleville springs 5 and the number of the Belleville springs, as both dominate the load characteristic of the live load structure, are proper when assembling the structure into the valve device because the stacked pattern of the Belleville springs 5 can be seen from outside.

There is an advantageous effect that it is easy to check whether or not the amount of compression of the Belleville springs 5 is appropriate because the graduations are prepared on the peripheral wall of the spring case 6.

Furthermore, the tightening-member accommodating groove 12a and the window 12b are formed as the groove portions 12 having the common structure. This enables the groove portion 12 to serve as the tightening-member accommodating groove 12a or the window 12b according to the circumferential position at which the spring case 6 is disposed when the live load mechanism is assembled into the valve device.

Embodiment 2

Figure 5:
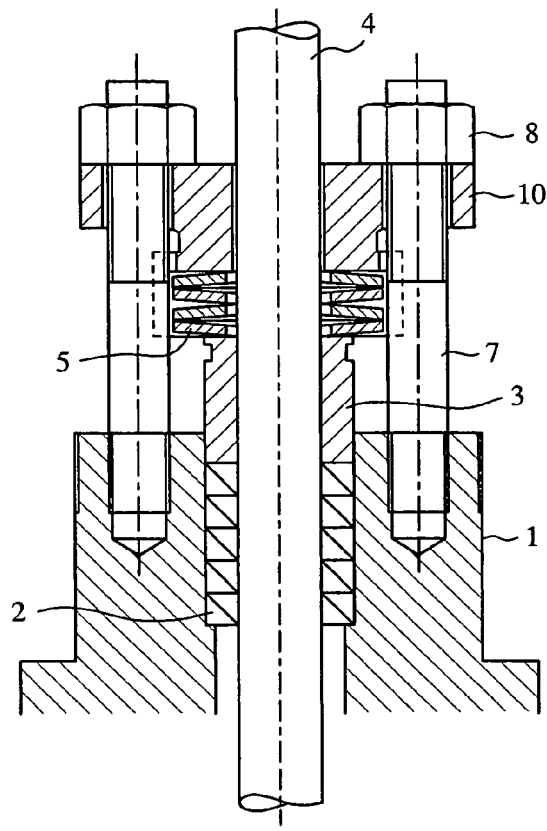
FIG. 5 is a longitudinal sectional view showing a valve device in accordance with embodiment 2 of the present invention.

Hereinafter, embodiment 2 of the present invention will now be described. FIG. 5 is a longitudinal sectional view showing a valve device according to the embodiment 2 of the present invention. The valve device shown in FIG. 5 includes a unitized flange 10 (packing flange) into which the spring case 6 and the packing flange 9 are integrated in place of these two components shown in FIG. 1. The unitized flange 10 has one axis center, and thereby readily fits the valve stem 4. The valve device of the embodiment 2 has the same structure as that of the embodiment 1 except this potion. Therefore, the explanation thereof is omitted.

As described above, according to the embodiment 2, the spring case 6 and the packing flange 9 are unitized, which can accomplish the reduction of the number of parts without changing the fundamental functions thereof, improvement of assembling productivity, and cost reduction.

Embodiment 3

Figure 6A:
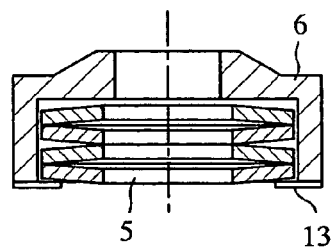
FIG. 6A and FIG. 6B are views showing the spring case to be assembled to the valve device in accordance with embodiment 3 of the present invention.
Figure 6B:
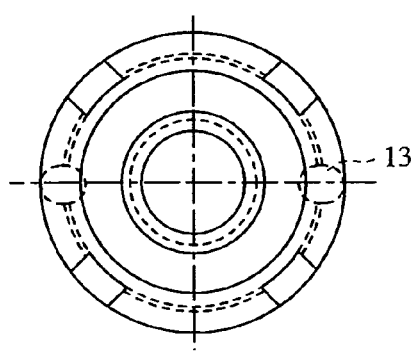

Hereinafter, embodiment 3 of the present invention will now be described. FIG. 6A and FIG. 6B are views showing the spring case to be assembled into the valve device in accordance with the embodiment 3 of the present invention, FIG. 6A is a longitudinal sectional view thereof and FIG. 6B is a top plan view thereof. Referring to FIG. 6, the bottom side of the spring case 6 is provided with a drop-preventing part 13 (drop-preventing means) that axially inwardly projects therefrom. The drop-preventing part 13 has the function of preventing the Belleville springs 5 accommodated in the spring case 6 from dropping therefrom. The valve device of the embodiment 3 has the same structure as that of the embodiment 1 except this potion. Therefore, the explanation is omitted.

Figure 7A:
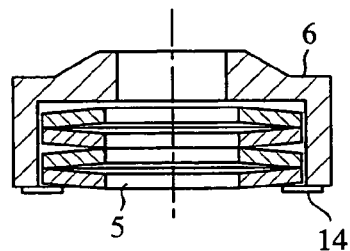
FIG. 7A and FIG. 7B are views showing the spring case different from that shown in FIG. 6A and FIG. 6B.
Figure 7B:
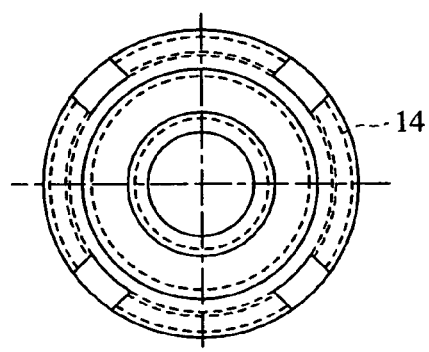

Further, FIG. 7A and FIG. 7B are views showing the spring case different from that shown in FIG. 6A and FIG. 6B, FIG. 7A is a longitudinal sectional view thereof and FIG. 7B is a top plan view thereof. Referring to FIG. 7A and FIG. 7B, the bottom peripheral portion of the spring case 6 is equipped with a drop-preventing lid 14 (drop-preventing means) having an annular shape in place of the drop-preventing part 13 shown in FIG. 6A and FIG. 6B. The portion of the drop-preventing lid 14, which abuts on the groove portion 12, has a concave shape that is generally similar to the cross-sectional shape of the groove portion 12, and in the portion thereof is disposed the stud bolt 7. The drop-preventing lid 14 has also the same function as that of the drop-preventing part 13.

As mentioned above, according to the embodiment 3, the drop-preventing means is provided to prevent the Belleville springs 5 accommodated in the spring case 6 from dropping therefrom, thus improving productivity in the assembly of the spring case 6 into the valve device.

Embodiment 4

Figure 8A:
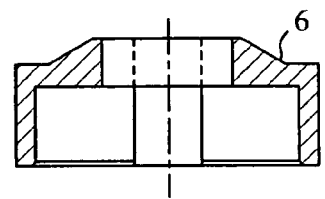
FIG. 8A and FIG. 8B are views showing the spring case to be assembled into the valve device according to embodiment 4 of the present invention.
Figure 8B:
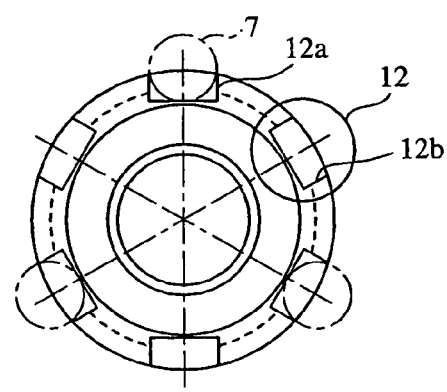

Hereinafter, embodiment 4 of the present invention will next be described. FIG. 8A and FIG. 8B are views showing the spring case to be assembled into the valve device in accordance with the embodiment 4 of the present invention, FIG. 8A is a front view thereof and FIG. 8B is a top plan view thereof. Referring to FIG. 8A and FIG. 8B, the spring case 6 is provided with six groove portions 12 in total in the peripheral portion thereof. Of these grooves, a group of the groove portions 12, which are the vertices of a regular triangle, are the tightening-member accommodating grooves 12a each accommodating the stud bolt 7, and another group of the groove portions 12, which are the vertices of another regular triangle, are the windows 12b. In other words, the spring case 6 is guided by three stud bolts 7. Moreover, each of the staffing box 1 and the packing flange 9 is also provided with three screw portions and tightening-member accommodating holes corresponding thereto; however, they are not shown.

In addition, the case in which two stud bolts are used is described in the embodiment 1, and the case where three ones are used is described in the embodiment 4; however, it is desirable that the number of groove portions 12 provided on the peripheral portion (peripheral wall) of the spring case 6 be in multiple numbers of the stud bolts to be used, and further, the adjacent groove portions 12 be disposed equidistantly (equiangularly) in the circumferential direction of the spring case 6. This can cope with a variety of design changes.

Additionally, it can be considered that the number of the groove portions 12 is not proportional to the number of the stud bolts 7 and the groove portions 12 are not equidistantly disposed; however, the above-described method is preferable from the viewpoint of the workability. In addition, the number of groove portions 12 is preferably about twice the number of stud bolts 7 from the viewpoint of the workability and minimizing the exposed area of the Belleville springs 5.

As mentioned above, according to the embodiment 4, the number of the groove portions 12 provided therein is in multiple numbers of the stud bolts 7, and the grooves are circumferentially equidistantly disposed. This can inevitably simultaneously position the spring case 6 and the windows 12b with respect to the axis center by the stud bolts 7 accommodated by the tightening-member accommodating grooves 12a.

Embodiment 5

Figure 9:
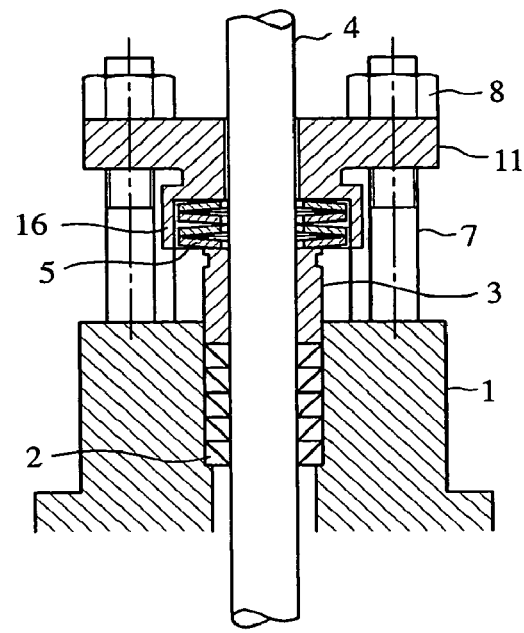
FIG. 9 is a longitudinal sectional view showing a valve device according to embodiment 5 of the present invention.
Figure 10:
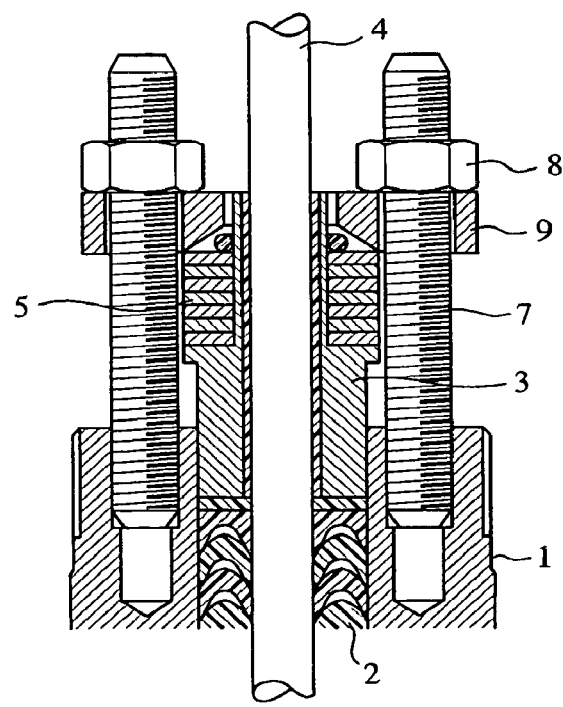
FIG. 10 is a longitudinal sectional view showing the valve device disclosed in U.S. Pat. No. 5,056,757.
Figure 11:
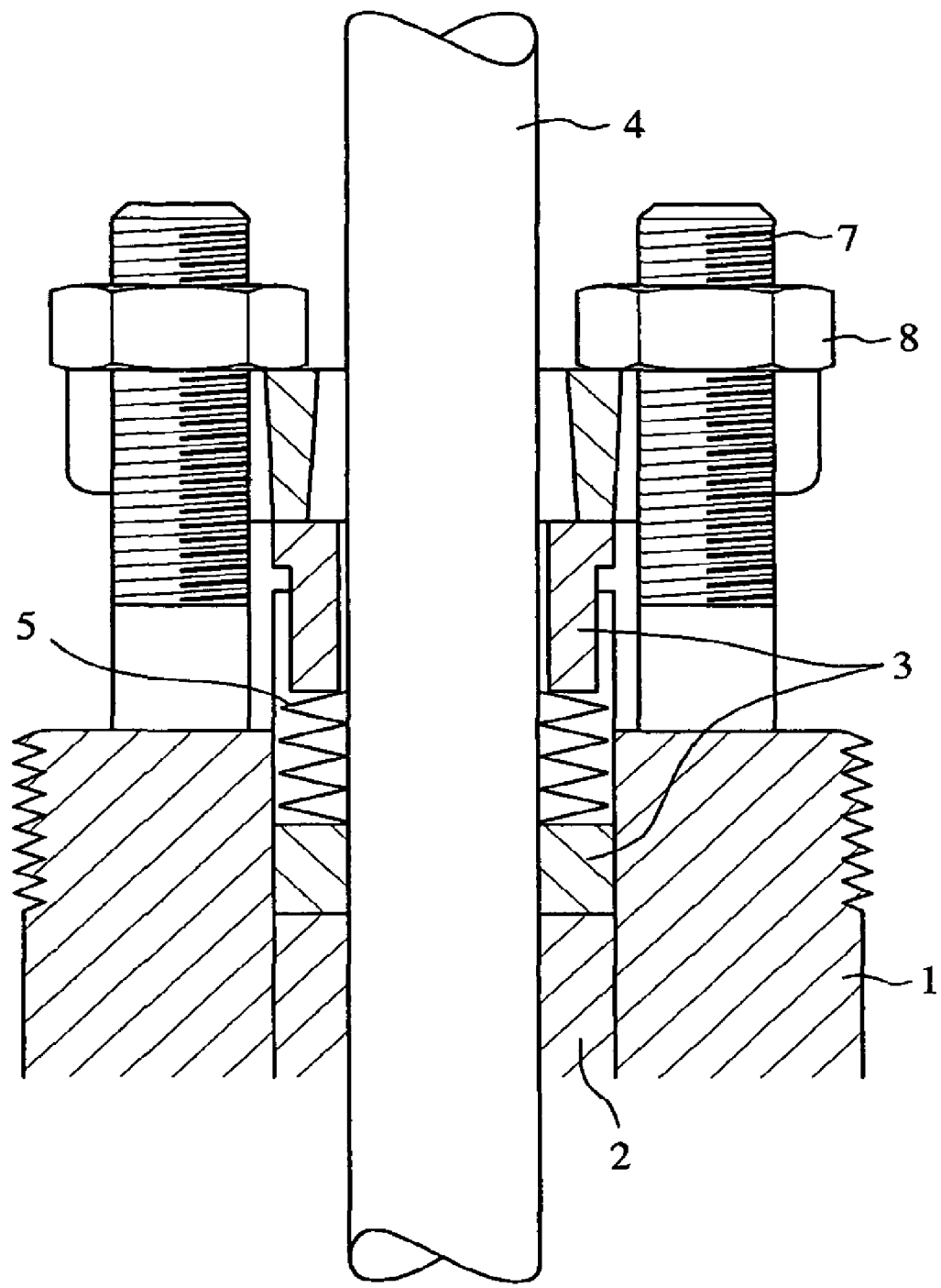
FIG. 11 is a longitudinal sectional view showing the valve device disclosed in U.S. Pat. No. 5,190,264.

Hereinafter, embodiment 5 of the present invention will now be described. FIG. 9 is a longitudinal sectional view showing a valve device according to the embodiment 5 of the present invention. The valve device shown in FIG. 9 includes a unitized flange 11 (packing flange) from which the groove portion 12 is eliminated, in place of the unitized flange 11 shown in the embodiment 2 (FIG. 5). In this unitized flange 11, the stud bolt 7 is disposed outwardly from the spring-member accommodating portion 16 that accommodates the Belleville springs 5. Thereby, in the staffing box 1, the radius between the tapped hole and the axis center is also enlarged.

This structure can eliminate the area of the Belleville springs 5 accommodated within the unitized flange 11, which is externally exposed, and can further prevent the infiltration of rain water and the adhesion of dust, though the window cannot be provided on the peripheral portion of the unitized flange 11.

In addition, the groove portions 12 shown in the embodiments 1-4 may be provided on the peripheral wall of the spring-member accommodating portion 16, and the stud bolts 7 may be disposed therein. In this case, the number of groove portions 12 and the number of stud bolts 7 are the same.

As described above, according to the embodiment 5, though the valve device does not have the function of window, the reduction of the number of parts, the improvement of assembling productivity, and the cost reduction can be accomplished.

Furthermore, the non-provision of the windows can further increase the effect of preventing the infiltration of rain water and the adhesion of dust.

Additionally, in the above description, for purposes of convenience, the expressions of upper, lower, right, and left were used; however, an actual valve devices are installed in various directions of instillation, and the present invention is not limited to the direction used in the above description.

What is claimed is:

1. A valve device comprising:
    a valve stem which is vertically movably inserted in a packing-accommodating means;
    a gland packing interposed between the packing-accommodating means and the valve stem;
    a packing flange which has a valve-stem accommodating hole provided at the center thereof and tightening-member accommodating holes provided around the periphery of this valve-stem accommodating hole, and which is disposed above the gland packing through a packing-pressing means;

a spring member having a valve-stem accommodating hole at the center thereof;

a spring case which has a valve-stem accommodating hole provided at the center thereof, and a plurality of same-shaped groove portions that are provided on the peripheral wall thereof, accommodates or holds said at least one or more spring members in the bottom opening of the valve-stem accommodating hole of said spring case, and which abuts the packing flange on the top closure thereof around the periphery of the valve-stem accommodating hole of said spring case; and a plurality of tightening members pressing the gland packing through the spring member, the spring case, and the packing flange, wherein each of the groove portions is structured to become either a tightening-member-accommodating groove or a window which is used for visibly checking the state of at least one or more spring members located inside, according to the circumferential position at which the spring case is disposed.

2. A valve device according to claim 1, wherein the peripheral wall of the spring case is graduated.

3. A valve device according to claim 1, wherein the packing flange and the spring case are integrated into a unitized flange.

4. A valve device according to claim 1, comprising a drop-preventing means at the bottom opening of the spring case.

\* \* \* \* \*